UNITED STATES PATENT OFFICE.

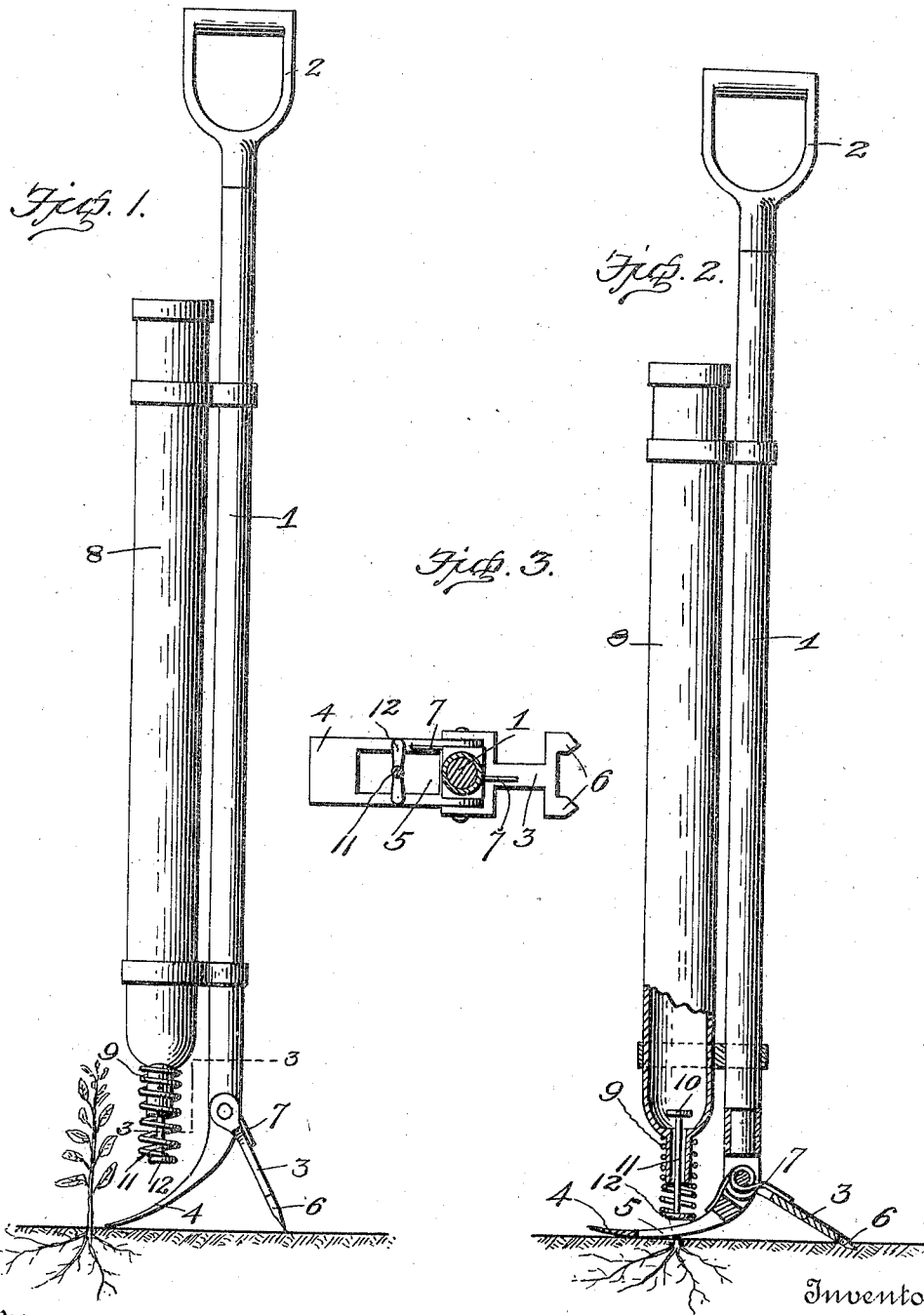

PHILO HALL, OF BROOKINGS, SOUTH DAKOTA.

WEED-DESTROYER.

947,906.  Specification of Letters Patent.  Patented Feb. 1, 1910.

Application filed August 25, 1909. Serial No. 514,637.

*To all whom it may concern:*

Be it known that I, PHILO HALL, a citizen of the United States, residing at Brookings, in the county of Brookings and State of South Dakota, have invented certain new and useful Improvements in Weed-Destroyers; and I do declare the following to be a full, clear, and exact description of the invention, such as will enable others skilled in the art to which it appertains to make and use the same.

This invention relates to improvements in weed destroyers.

One object of the invention is to provide a device of this character adapted to be operated by a person in standing position and having means to cut off the weed and to apply a destroying solution or liquid to the lacerated end of the root, thus killing the same.

A further object is to provide a device which is simple, strong and durable in construction, efficient and reliable in operation and well adapted to the purpose for which it is designed.

With the foregoing and other objects in view, the invention consists of certain novel features of construction, combination and arrangement of parts, as will be more fully described and particularly pointed out in the appended claims.

In the accompanying drawings, Figure 1 is a side view of the invention, showing the parts in an inoperative position; Fig. 2 is a vertical sectional view with the parts in operative position; Fig. 3 is a horizontal sectional view on the line 3—3 of Fig. 1.

In the embodiment of the invention, I provide an operating bar 1 having on its upper end a handle 2, and pivotally connected to its lower end a foot brace or piece 3 which projects at an angle in one direction below the end of the bar: Also pivotally connected to the lower end of the bar is a curved blade or knife 4, said knife being provided with a slot or opening 5, the purpose of which will be hereinafter described. The outer end of the foot brace 3 is preferably provided with ground engaging teeth or prongs 6 whereby when the device is operated, the end of the brace will firmly engage the ground and prevent any backward movement of the tool. The foot brace 3 and blade 4 have connected thereto a suitable spring 7 whereby the same are restored to their normal positions after being operated to cut the weeds, in the manner hereinafter described.

Secured to the bar 1, is a vertically disposed tank or receptacle 8 adapted to contain a destroying solution or liquid which, at the proper time, is discharged upon the cut roots of the weeds, thus killing the same. The tank 8 is provided on its lower end with a tapered spout 9 in which is arranged a spring retracted valve 10, the stem 11 of which has on its outer end a cross bar 12 which is adapted to be engaged by the blade or knife 4 whereby the valve will be opened at the proper time to discharge the liquid from the tank.

In the operation of the device, the blade and foot brace are engaged with the ground, so that the sharp end of the blade will be adjacent to the root of the weed to be destroyed, after which pressure is applied to the handle end of the bar which will force the blade downwardly and forward into engagement with the root of the weed, thus severing the root a slight distance below the surface of the ground. Simultaneously with the cutting of the root of the weed, the valve 10 in the tank 8 is opened by pressure of the blade on the cross bar 12 of the stem 11, thus permitting the contents of the tank to be discharged through the slot 5 of the blade and onto the cut and exposed end of the root which remains in the ground, thus destroying the root and preventing further growth of the weed.

By means of a device of this character, weeds may be quickly and easily removed and destroyed by a person in a standing posture, thus reducing the labor necessary in performing this operation in the usual manner and in a stooping position.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a device of the character described, an operating bar, a blade pivotally mounted on one end of said bar, a brace also secured to the bar and adapted to engage the ground and to form an anchor, whereby when pressure is applied to the operating bar, the blade will be projected forwardly to sever the root of the weed.

2. In a device for destroying weeds, an operating bar, a blade pivotally mounted on one end of said bar, a foot brace also pivotally connected to said end of the bar and adapted to be engaged with the ground, whereby when the bar is depressed, the blade will be forced forwardly into engagement with the root of the weed to sever the latter, and means whereby a destroying fluid is applied to the severed end of the root remaining in the ground.

3. In a root destroying device, an operating bar, a handle on one end of said bar, a blade pivotally mounted on the opposite end of the bar, a foot brace also pivotally mounted on said end, a spring to restore said blade and foot brace to their normal position after being operated to sever the root of the weed, a tank carried by said operating bar, and means whereby a portion of the contents of the tank is discharged after each operation of the device to destroy the weed cut thereby.

4. In a weed destroying device, an operating bar, a handle on one end of said bar, a slotted blade pivotally secured to the opposite end of the bar, a foot brace also pivotally connected to said end, ground engaging prongs on said foot brace, a tank carried by said operating bar, a valve arranged in the discharge end of said tank, and means whereby the valve is operated by said blade to discharge a portion of the contents of the tank at each operation of the device, said discharged contents of the tank passing through the slot in said blade and onto the root of the weed severed thereby.

In testimony whereof I have hereunto set my hand in presence of two subscribing witnesses.

PHILO HALL.

Witnesses:
GERTRUDE ENRIGHT,
NELLIE ALLISON.